United States Patent Office 3,375,238
Patented Mar. 26, 1968

3,375,238
PROCESS FOR SUSPENSION POLYMERIZATION OF VINYL CHLORIDE
Hans Bauer and Joseph Heckmaier, Burghausen, Upper Bavaria, Germany, assignors to Wacker-Chemie G.m.b.H., Munich, Germany, a firm of Germany
No Drawing. Filed Apr. 22, 1964, Ser. No. 361,863
Claims priority, application Germany, May 17, 1963, W 34,512
4 Claims. (Cl. 260—92.8)

ABSTRACT OF THE DISCLOSURE

This invention relates to a process for the polymerization of a polymerizate containing at least 80% polyvinyl chloride which comprises the steps of (1) mixing monomers selected from the group consisting of vinyl chloride and mixtures of vinyl chloride with up to 20% of olefinically unsaturated compounds copolymerizable with vinyl chloride, with water in the presence of a monomer-soluble polymerization catalyst and a mixed suspension stabilizer consisting of from 1% to 99% of a water-soluble methyl cellulose and from 99% to 1% of a water-soluble hydroxyethyl cellulose, (2) heating said mixture to a temperature between 0° C. and 160° C. for a time sufficient to effect polymerization while under continuous agitation, and (3) recovering said polymerizate. The so-prepared polymerizate has a narrow range of particle size distribution and is easier to pre-gel.

---

The suspension or bead polymerization of vinyl chloride, that is, the polymerization of vinyl chloride in aqueous dispersion in the presence of suspension stabilizers, especially protective colloids, and monomer-soluble catalysts, to form polymerized suspensions which rapidly settle after cessation of the agitation required during the polymerization for maintenance of the dispersion, has been known for a long time. Among others, water-soluble methyl celluloses or hydroxy-ethyl celluloses or methyl hydroxy-ethyl celluloses have been used as protective colloids for this purpose.

With the aid of certain types of methyl celluloses or methyl hydroxy-ethyl celluloses, polymerizates are obtained which are generally satisfactory for further treatment, but not particularly well suited for manufacturing processes in which mixtures of polymerizates and customary additives are treated without preliminary agglomerization or granulation, for instance, in extrusion press and injection molding devices, because they have inadequate flow properties. The suspension polymerizates prepared in conjunction with the use of hydroxy-ethyl cellulose as a protective colloid, in addition, are unsatisfactory with respect to their ability to be subsequently combined with softeners.

It is an object of the invention to develop a process for the polymerization of a polymerizate containing at least 80% polyvinyl chloride which comprises the steps of (1) mixing monomers selected from the group consisting of vinyl chloride and mixtures of vinyl chloride with up to 20% of olefinically unsaturated compounds copolymerizable with vinyl chloride, with water in the presence of a monomer-soluble polymerization catalyst and mixed suspension stabilizer consisting of from 1% to 99% of a water-soluble methyl cellulose and from 99% to 1% of a water-soluble hydroxy-ethyl cellulose, (2) heating said mixture to a temperature between 0° C. and 160° C. for a time sufficient to effect polymerization while under continuous agitation, and (3) recovering said polymerizate.

Another object of the invention is to develop a process of polymerization of vinyl chloride in an aqueous dispersion in the presence of monomer-soluble polymerization catalysts and a mixed suspension stabilizer consisting of from 1% to 99% of a water-soluble methyl cellulose and from 99% to 1% of a water-soluble hydroxy-ethyl cellulose, whereby polymerizates are obtained within a narrow range of particle size distribution.

A further object of the invention is to improve the process of polymerization of vinyl chloride and mixtures of vinyl chloride with up to 20% of an olefinically unsaturated compound copolymerizable with vinyl chloride in water in the presence of a monomer-soluble polymerization catalyst and a water-soluble suspension stabilizer, by conducting the polymerization in the presence of a mixture consisting of from 1% to 99% of a water-soluble methyl cellulose and from 99% to 1% of a water-soluble hydroxy-ethyl cellulose, as said suspension stabilizer.

These and other objects of the invention will become more apparent as the description thereof proceeds.

It has now been found that by suspension polymerization of vinyl chloride or mixtures of vinyl chloride with up to 20% by weight of said mixtures of an olefinically unsaturated compound copolymerizable with vinyl chloride in water in the presence of cellulose derivatives using monomer-soluble catalysts, polymers are obtained which do not exhibit the disadvantages of the prior art if the cellulose derivatives are mixtures consisting of from 1% to 99% of water-soluble methyl celluloses and from 99% to 1% of water-soluble hydroxy-ethyl celluloses, the percentages of the celluloses in each case being based upon the total weight of the cellulose derivative mixture.

In the process according to the present invention the polymerizates are obtained within a narrow range of particle size distribution. The polymerizates obtained in accordance with the present invention are even easier to pre-gel than the previously known suspension polymerizates, and it is possible to manufacture therefrom glass-clear foils which are substantially free from fish eyes. The polymerizate particles exhibit an adequate capacity for softeners and are particularly well suited for the manufacture of so-called "dry blends." Mixtures prepared from the polymerizates manufactured in accordance with the present invention and customary additives, such as stabilizers and optionally also softeners and/or pigments, fillers and other assistants, which mixtures are processed most often in rapidly operating mixing devices, are extraordinarily suitable in all those instances where free flowing mixtures of polymerizates and the above-mentioned additives may be used without preliminary agglomeration or granulation. For instance, said mixtures can be utilized in manufacturing processes using extrusion presses or injection molding devices. The polymerizates obtained in accordance with the present invention correspond to the best previously known suspension polymerizates of vinyl chloride with respect to their color fastness under the action of heat, electro-insulating properties and water absorption.

Up to 20%, based on the total weight of the monomers, of an olefinically unsaturated compound such as vinyl and/or acrylic compounds which are copolymerizable with vinyl chloride may be polymerized together with the vinyl chloride. In particular, up to 20% of a vinyl ester of a lower alkanoic acid such as vinyl acetate may be employed as an olefinically unsaturated compound copolymerizable with vinyl chloride.

All of the monomer-soluble polymerization catalysts suitable for the suspension polymerization of vinyl chloride may be used within the scope of the process according to the present invention. Examples of such catalysts are (a) organic peroxides, such as (1) the diacylperoxides, for example, diacetyl, acetylbenzoyl, dilauroyl, dibenzoyl and bis - 2,4 - dichlorobenzoylperoxide; (2) the dialkylperoxides, for example, di-tert.-butylperoxide; (3) the mixed anhydrides of organic sulfo peracids with organic acids, such as acetyl cyclohexanesulfonyl peroxide; (b) organic hydroperoxides, such as cumene hydroperoxide, and (c) azo compounds known to be useful as polymerization catalysts, such as azoisobutyric acid dinitrile. Particularly advantageous is the concurrent use of diacylperoxides, such as dilauroylperoxide with acetyl cyclohexanesulfonyl peroxide. The amount of polymerization catalysts is in general 0.001 to 3% by weight, preferably 0.001 to 0.3% by weight. In the case of acetyl cyclohexanesulfonyl peroxide as little as 0.00005 to 0.3% by weight is sufficient. In each case the percentages are based upon the weight of vinyl chloride monomer or monomers.

The ratio of water to monomer in the process of the invention is not critical. In general, the amount of monomer is from 10 to 60% in the total weight of water and monomer.

Water-soluble methyl celluloses are the methyl ethers of cellulose with a substitution degree, that is, with a ratio of the number of methoxy groups to the number of glucose anhydride units, of 0.9 to 2.6, especially from 1 to 2.5. Their viscosity advantageously lies in the range of 6 to 500 cps., determined in a 2% aqueous solution at 20° C. in a Hoppler viscosimeter. Preferred as water-soluble methyl celluloses are those which have been prepared by the reaction of liquid methyl chloride with an alkali metal cellulose at a temperature between about 40° C. and about 90° C. Especially preferable are methyl celluloses which are prepared by the processes described in Belgian Patents 515,397 and 527,692, namely, by heating an alkali metal cellulose with methyl chloride in an amount at least five times the weight of the air-dried cellulose in pressure vessels at 40 to 90° C. or by admixing the alkali metal cellulose with methyl chloride in an amount of at least five times the weight of air-dried cellulose, followed by removal of the excess of methyl chloride above 1.5 to 3 times the amount of the weight of alkali metal cellulose and then heating the residue in pressure vessels at 40 to 90° C. It is advantageous if the methyl cellulose, regardless of whether it has been prepared by the above-described processes or another process, is before being used in the process of the invention treated pursuant to the process described in U.S. Patent 2,833,758, namely, converted in the moist state with a water content of 50% to 70% by weight by homogenization under pressure into a plastic mass, which mass is milled in a high speed rotating comminution mill and dried.

Water-soluble hydroxy-ethyl celluloses are products obtained by reaction of cellulose or alkali metal cellulose with ethylene oxide and have a substitution degree, that is, a ratio of the number of reacted equivalents of ethylene oxide to the number of glucose-anhydride units, of at least 1.0, especially 1.33 to 2.5. More advantageously, their viscosity lies within the range of 10 to 5000 cps., determined in a 2% aqueous solution at 20° C. in the Hoppler viscosimeter.

It is preferred to use mixtures of 10 to 90%, especially 20 to 80%, of water-soluble methyl cellulose and 90 to 10%, especially 80 to 20%, of water-soluble hydroxyethyl cellulose, the percentages in each case being based upon the total weight of the cellulose derivative mixture.

The cellulose derivative mixtures used in accordance with the present invention are employed in amounts of 0.01 to 0.5% by weight, preferably 0.04 to 0.25% by weight, based on the weight of the vinyl chloride monomer.

Anionic, cationic, amphoteric and non-ionic emulsifiers and/or inorganic salts may be concurrently used in amounts of 0.01 to 1% by weight, based on the weight of water. Examples of anionic emulsifiers are the following; alkali metal salts, especially the sodium and potassium salts, as well as ammonium and alkaline earth metal salts, particularly the calcium salts; of long chain fatty acids or higher alkanoic acids such as lauric acid and stearic acid; of high unsaturated aliphatic hydrocarbon monocarboxylic acids, such as oleic acid; of rosin acids such as abietic acid; of protein fatty acid condensation products; of acid phosphoric acid alkyl esters, such as sodium diethylhexylphosphate; of said fatty alcohol sulfuric acid esters; of hydrocarbon sulfonic acids, such as those which are available in commerce under the mark "Mersolates;" of alkylnaphthalene sulfonic acids; and of sulfosuccinic acid dialkyl esters such as sodium diethylhexyl sulfosuccinate.

Cationic emulsifiers may also be used, such as dodecyl trimethyl ammonium bromide as well as amphoteric emulsifiers such as dodecyl betaine.

Examples of non-ionic emulsifiers are partial fatty acid esters of polyvalent alcohols, such as glycerin monostearate, sorbitol monolaurate or sorbitol monopalmitate; partial ethers of higher fatty alcohols and polyvalent alcohols; polyoxyethylene esters of fatty acids; as well as the polypropylene oxide-polyethylene oxide block polymer sold under the tradename "Pluronics."

Examples of inorganic salts include water-soluble alkali metal and alkaline earth metal salts of hydrochloric acid, sulfuric acid; carbonic acid and phosphoric acid, such as sodium chloride, sodium polyphosphate, sodium sulfate, calcium chloride, magnesium chloride and calcium bicarbonate. If inorganic salts are used concurrently, the alkali metal chlorides and alkali metal sulfates as well as alkaline earth metal chlorides, especially calcium chloride, are preferred.

The pH value of the polymerization reaction mixture is adjusted in the range of 4 to 9, preferably between 5 to 8.

The polymerization temperature lies within the range which is customary for the polymerization of vinyl chloride catalyzed by monomer-soluble free radical forming catalysts, that is, approximately between 0° and 160° C., preferably at about 20° to 70° C. It is performed accompanied by the degree of agitation customary in the suspension polymerization for maintenance of the dispersion of the monomer or monomers in the aqueous medium, and preferably in enameled or stainless steel-plated autoclaves.

The following example is illustrative of the invention. It is not, however, to be construed as limiting the invention. Obviously, other expedients known to those skilled in the art may be substituted for the specific embodiment hereinafter disclosed.

The viscosities indicated in the following example were in each case determined at 20° C. in the Hoppler viscosimeter with a 2% aqueous solution.

*Example*

A mixture of 875 kgm. of water which had previously been softened with the aid of ion exchangers, 275 gm. (0.055% by weight based on the weight of monomer) of methyl cellulose prepared pursuant to Belgian Patent 527,692 with an average of 1.7 methoxy groups per glucose anhydride unit and a viscosity of 20 cps., 275 gm. (0.55% by weight based on the weight of monomer) of hydroxy-ethyl cellulose with an average of 1.9 bonded equivalents of ethylene oxide per glucose anhydride unit having a viscosity of about 300 cps. (available in commerce under the registered trademark "Cellosize"), 500 gm. (0.1% by weight based on the weight of monomer) of dilauroylperoxide and 75 gm. of sodium bicarbonate (0.015% by weight based on the weight of monomer) was placed into an autoclave lined with stainless steel and having a capacity of 2000 liters. After purging the autoclave with nitrogen, 500 kgm. of vinyl chloride were added to this mixture. Thereafter, the charge was heated to 54° C. for 21 hours accompanied by stirring. The principal amount of the polymerizate recovered by centrifuging, washing with water and drying, had a grain size above 200µ. The apparent density of the polymer was 580 to 630 gm/l.

A polymerizate was prepared for comparison under otherwise identical conditions, but by using, instead of the cellulose ether mixture, 550 gm. (0.11% by weight, based on the weight of monomer) of methyl cellulose of the above described type. This polymerizate consisted mainly of particles having a particle size between 60 and 200µ and had an apparent density of 550 to 570 gm/l. Because of its low particle size and the relatively low packed weight, this polymerizate prepared for comparison has poorer flow properties than the polymerizate obtained according to the process of the present invention.

Another polymerizate was prepared for purposes of comparison under otherwise identical conditions, but wherein, instead of the cellulose ether mixture, 550 gm. (0.11% by weight, based on the weight of monomer) of hydroxy-ethyl cellulose of the above-described type were used. This polymerizate consisted mainly of particles having a particle size between 60 and 200µ and had an apparent density of 690 to 740 gm./l. This very high packed weight interferes in the subsequent manufacturing process because of the poor softener absorption connected therewith.

While we have disclosed a specific embodiment of the invention, it will be readily apparent to one skilled in the art that the present invention is not limited to this specific embodiment and that various changes and modifications may be made without departing from the spirit of the invention and the scope of the appended claims.

We claim:

1. A process for the polymerization of a polymerizate containing at least 80% polyvinyl chloride which comprises the steps of (1) mixing monomers selected from the group consisting of vinyl chloride and mixtures of vinyl chloride with up to 20% of olefinically unsaturated compounds copolymerizable with vinyl chloride, with water in the presence of a monomer-soluble polymerization catalyst and mixed suspension stabilizer consisting of from 1% to 99% of a water-soluble methyl cellulose and from 99% to 1% of a water-soluble hydroxy-ethyl cellulose, (2) heating said mixture to a temperature between 0° C. and 160° C. for a time sufficient to effect polymerization while under continuous agitation, and (3) recovering said polymerizate.

2. The process of claim 1 wherein said mixed suspension stabilizer consists of (1) from 10% to 90% of a water-soluble methyl cellulose prepared by the reaction of liquid methyl chloride with an alkali metal cellulose at a temperature between about 40° C. and 90° C., said methyl cellulose containing from 0.9 to 2.6 methoxy groups per glucose-anhydride unit and having a viscosity between 6 and 500 cps., as measured in a 2% aqueous solution at 20° C. in a Hoppler viscosimeter and (2) from 90% to 10% of a water-soluble hydroxy-ethyl cellulose containing from 1.0 to 2.5 reacted equivalents of ethylene oxide per glucose anhydride unit and having a viscosity between 10 and 5000 cps., as measured in a 2% aqueous solution at 20° C. in a Hoppler viscosimeter.

3. In the process of polymerizing a suspension of vinyl chloride in water in the presence of a monomer-soluble polymerization cataylst and a water-soluble suspension stabilizer, the improvement which comprises utilizing as said suspension stabilizer a mixed stabilizer consisting of from 1% to 99% of a water-soluble methyl cellulose and from 99% to 1% of a water-soluble hydroxy-ethyl cellulose.

4. The process of claim 3 wherein said mixed suspension stabilizer consists of (1) from 10% to 90% of a water-soluble methyl cellulose prepared by the reaction of liquid methyl chloride with an alkali metal cellulose at a temperature between about 40° C. and 90° C., said methyl cellulose containing from 0.9 to 2.6 methoxy groups per glucose-anhydride unit and having a viscosity between 6 and 500 cps., as measured in a 2% aqueous solution at 20° C. in a Hoppler viscosimeter and (2) from 90% to 10% of a water-soluble hydroxy-ethyl cellulose containing from 1.0 to 2.5 reacted equivalents of ethylene oxide per glucose-anhydride unit and having a viscosity between 10 and 5000 cps., as measured in a 2% aqueous solution at 20° C. in a Hoppler viscosimeter.

References Cited

UNITED STATES PATENTS 3,205,204  9/1965  Heckmaier et al. ____ 260—29.8

JOSEPH L. SCHAFER, *Primary Examiner.*

J. H. DONAHUE, *Assistant Examiner.*